United States Patent [19]

Mann

[11] Patent Number: 4,496,823
[45] Date of Patent: Jan. 29, 1985

[54] MULTIPLE PASSAGE CONDUIT FOR FUME EXTRACTING WELDING GUN

[75] Inventor: Robert N. Mann, Etobicoke, Canada

[73] Assignee: Bob Mann & Associates Incorporated, Mississauga, Canada

[21] Appl. No.: 443,175

[22] Filed: Nov. 22, 1982

[51] Int. Cl.³ .......................... B23K 9/32; F16L 11/04
[52] U.S. Cl. ................................ 219/137.41; 138/115; 219/137.9
[58] Field of Search .................... 138/115; 219/137.41, 219/137.9, 137.51, 137.44

[56] References Cited

U.S. PATENT DOCUMENTS 3,911,242 10/1975 Strang ............................ 219/137.41
3,980,860 9/1976 Howell et al. ................. 219/137.41
4,057,705 11/1977 Cockrum et al. ............... 219/137.41

FOREIGN PATENT DOCUMENTS 330182 10/1935 Italy ..................................... 138/115

Primary Examiner—Clifford C. Shaw
Assistant Examiner—Alfred S. Keve
Attorney, Agent, or Firm—Sim & McBurney

[57] ABSTRACT

An improved flexible hose having particular utility for a fume extracting welding gun is described. The hose has a smooth outer surface, an inner cylindrical compartment which receives the power cable and welding wire and a plurality of radial webs which define compartments for extracting fumes and for conveying shielding gas to the welding site.

8 Claims, 7 Drawing Figures

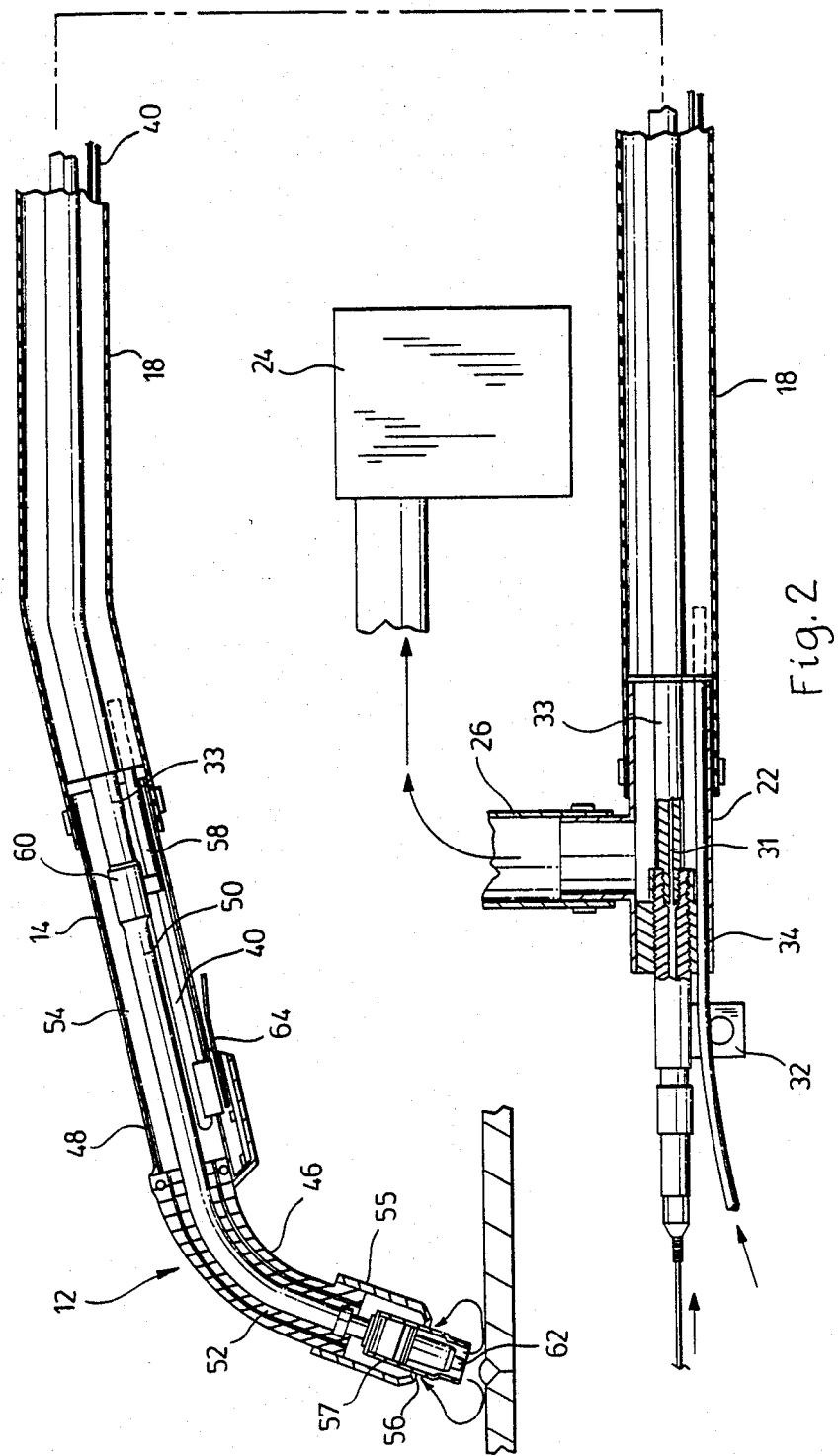

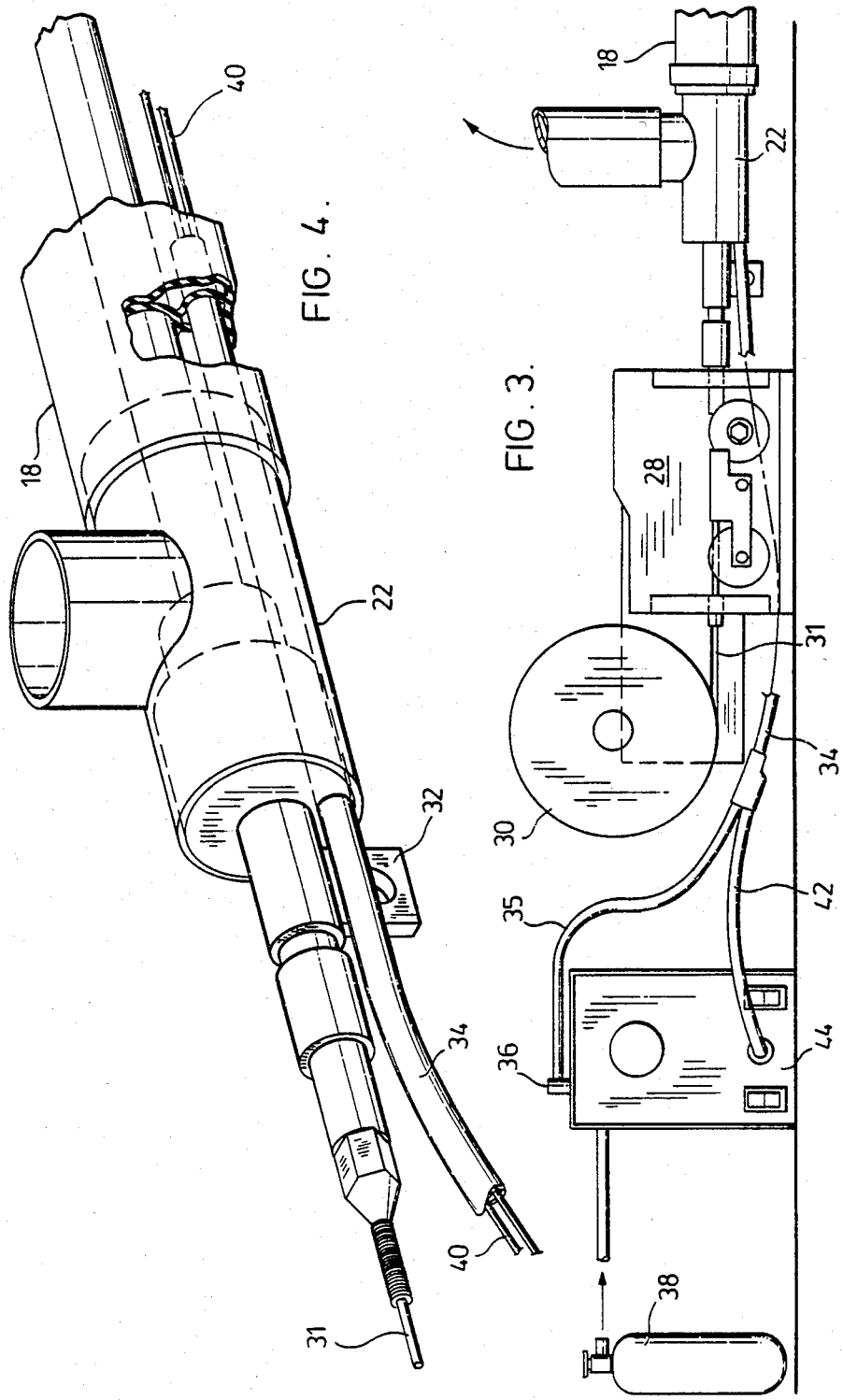

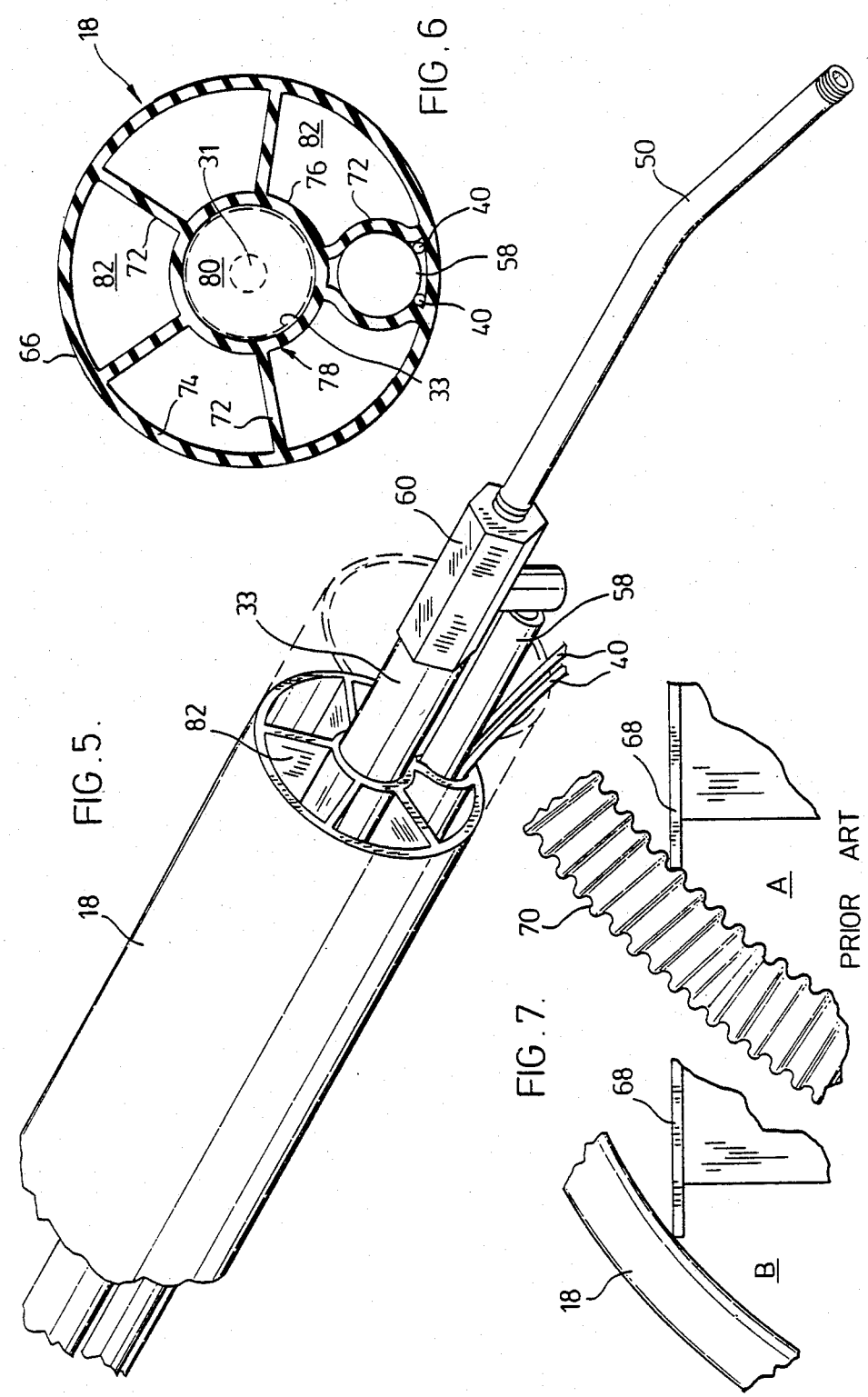

MULTIPLE PASSAGE CONDUIT FOR FUME EXTRACTING WELDING GUN

FIELD OF THE INVENTION

The present invention relates to multiple passage conduits, especially for use with welding guns of the type wherein fumes are extracted from the vicinity of the arc welding zone.

BACKGROUND TO THE INVENTION

Arc-welding operations are known to produce undesirable fumes during the welding process, many of them being noxious to the welder or others in the vicinity of the welding operation. Such fumes when allowed to accumulate in confined spaces have long been known to constitute a safety hazard, as well as an interference to welder visibility and general welding operation efficiency, and numerous means have been employed by the welding industry to dissipate these fumes as they are generated.

One such procedure involves the use of a conduit associated with the welding gun through which undesirable product gases of the welding operation are extracted by means of a vacuum applied to the conduit. The conduit commonly comprises an outer shell defining a hollow conduit through which the gases pass and in which are located a continuous weld wire, a power cable and also source of shield gas for the welding tip.

The welding gun is connected to vacuum system, wire feed electrical power input, and shield gas feed by a flexible outer corrugated sheath or hose. While the corrugations impart considerable flexibility to the hose, they provide no support for the weld wire, power cable or shield gas feed pipe, can wear through to expose the electrical power cable, with consequent danger of shorting, tend to be bulky and heavy, and are also prone to catch on projections, and hence are difficult to manoeuvre.

There are also other instances where a variety of materials must be conveyed or extended from one location to another and no satisfactory means exists for achieving the desired result.

SUMMARY OF INVENTION

In accordance with the present invention, there is provided a multiple passage conduit or hose which is flexible, smooth-surfaced and is divided into a plurality of separate discrete internal compartments which extend for the length of the hose.

Preferably, the hose comprises an axial cylindrical passage and a plurality of radially-extending webs joining the outer surface of the cylindrical passage to the inner surface, to define separate and discrete compartments surrounding the central cylindrical passage. The hose is preferably constructed by extrusion of rubber or flexible polymeric material, so that the elements are integrally formed.

When utilized for fume-extracting welding gun operations, the power cable and weld wire may be located in the central compartment, shield gas may be fed by one of the other compartments while fumes from the welding site are extracted through the others.

In this way, the power cable is supported internally of the hose and, even if the outer wall of the hose is worn through, which is highly unlikely in view of the robust nature of the hose, the power cable is not exposed and shorting cannot occur. Further, the central compartment is surrounded by flowing gas which cools the power cable located therein.

While the invention is described hereinafter particularly with reference to such fume-extracting welding guns, the invention also is applicable to other systems wherein multiple materials are to pass or flow through a hose.

BRIEF DESCRIPTION OF DRAWINGS

FIG. 2 is a part-sectional view of portions of the welding apparatus of FIG. 1;

FIG. 3 is an elevational view of the services supply end of the apparatus of FIG. 1;

FIG. 4 is a perspective view of a detail of the view of FIG. 3;

FIG. 5 is a perspective sectional view of the flexible hose used in the structure of FIG. 1 and constructed in accordance with the present invention;

FIG. 6 is an end view of the flexible hose of FIG. 5; and

FIG. 7 is a perspective view of a corrugated hose as used in the prior art in comparison with the present invention.

DESCRIPTION OF PREFERRED EMBODIMENTS

Figure 1:
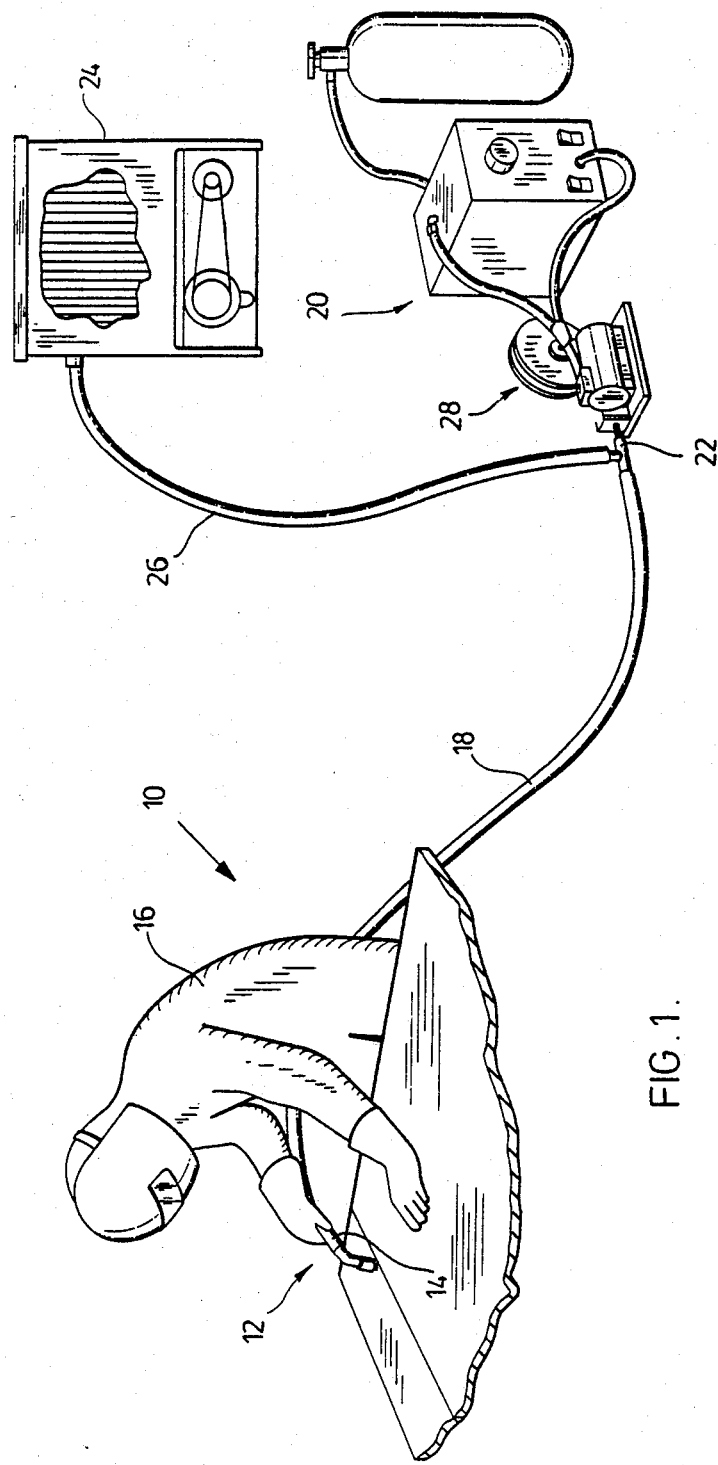
FIG. 1 is a schematic representation of a fume-extracting welding apparatus incorporating the hose of the present invention.

Referring to the drawings, FIGS. 1 to 4 illustrate schematically a fume extracting welding gun 10 incorporating a hose constructed in accordance with the present invention. The gun 10 includes a head portion 12, a control handle portion 14 gripped by a welder 16 during operation, a flexible connector hose portion 18, and a services supply portion 20.

The flexible connector hose 18 terminates in a T-adapter 22 which communicates with a vacuum pump 24 by a pipe 26. The vacuum pump 24 applies a vacuum to the interior of the hose 18 to remove fumes from adjacent the weld site at the head portion end of the unit 10.

The services supply portion 20 comprises a consumable welding wire feed mechanism 28 which includes a reel 30 of welding wire 31, an electrical connector 32 connected to a power cable 33 which surrounds the weld wire 31, an inert gas feed pipe 34 connected by pipe 35 through an electrically-operated solenoid valve 36 to a source of inert gas 38 for providing shield gas at the welding tip. The pipe 34 also carries electrical connector wires 40 which pass by pipe 42 to a switched electrical power source 44, which also serves to actuate the solenoid valve 36.

The head portion 12 of the welding gun 10 comprises a curved tubular housing 46 and a tubular sheath 48 of the control handle portion 14, which enclose a hollow power connector 50.

Fume extraction is provided by interconnecting annular fume extracting passageways 52 and 54 disposed between the tubular casings 46 and 48 and the power connector 50, which provide a conduit for fumes entering the head portion 12 through an annular opening 56 to the hose 18 and thence, through passageways therein, described below, to the T-adapter 22 under the influence of vacuum applied thereat.

The annular opening 56 is provided between an outer sleeve 55 and inner sleeve 57. The outer sleeve 55 is slidable relative to the inner sleeve 57 to move the annular opening 56 towards or away from the welding site. In this way, the actual vacuum applied to the welding site for fume extraction may be varied.

An inert gas flow pipe 58 connects with the hose 18 and terminates in a collar 60 which establishes communication between the inert gas feed pipe 34 and the interior of the power connector 50, to feed shielding gas to the welding tip 62. The control handle portion 14 of the gun 10 includes an operator switch 64 connected to the downstream end of the connector wires 40 for operating the gun 10.

The connecting hose 18 of the invention has a novel construction, as illustrated in particular in FIGS. 5 and 6. As seen therein, the hose 18, preferably formed by extrusion of rubber or other flexible polymeric material, has a smooth outer surface 66. The smooth nature of the outer surface 66 prevents the hose 18 from becoming caught on projecting surfaces 68, such as occurs with the prior art corrugated surface hoses 70, as seen by comparison of FIGS. 7A and B.

The hose 18 has a plurality of radial webs 72 which extend from integral connection with the inner surface 74 of the hose 18 to integral connection with the outer surface 76 of a cylindrical tube 78 concentric with the pipe 18. The cylindrical tube 78 defines an inner passageway or compartment 80 extending for the length of the hose 18 and in which the electrical cable 33 and the concentric weld wire 31 are located.

The radial webs 72 define a plurality of compartments 82 which extend for the length of the hose 18.

One passageway 82 is used to convey inert gas, such as, carbon dioxide from the services supply 20 to the head 12, and to house the electrical connecting wires 40. As may be seen in FIGS. 2, 4 and 5, at each end of the compartment 82 which feeds the inert gas a short length of pipe is received therein in gas tight fit to convey the inert gas to the compartment (pipe 34) at the services end and to convey the inert gas from the compartment (pipe 58) at the head portion end. Alternatively, the compartment 82 may house a continuous pipe through which the inert gas is flowed.

The electrical connecting wires 40, which extend from the electrical power source 44 to the operator-activated switch 64, pass through the same compartment as the inert gas and, as may be seen in FIGS. 2, 4 and 5, enter the compartment internally of the pipe 34 at the services end and exit the compartment externally of the pipe 58.

The remainder of the compartments 82 serve to convey fumes from the head portion 12. The compartments 82 communicate with the annular passageway 54 at the head portion and with the pipe 26 at the services end.

In contrast with the prior art hose connectors 70, not only is the outer surface 66 smooth, but also the power cable 33 is supported remote from the wall of the hose in its own passageway 80, so that, even in the unlikely event of the outer wall being worn through, the power cable 33 is not exposed and shorting cannot occur.

Further, the power cable compartment 80 is completely surrounded by a flow of gas, in the form of the extracted fumes and the inert gas, and this provides cooling to the power cable 33.

Although the structure of the hose 18 which is illustrated represents the preferred embodiment of the invention, nevertheless modifications may be made thereto without departing from the invention. For example, the compartment 82 conveying the inert gas feed pipe 34 is illustrated to be of much smaller dimensions than the other compartments 82, but all the compartments 82 may have the same dimensions, if desired. Further the number and form of the compartments may be varied, as desired. Central compartment 80 may be omitted, if desired, and the power cable 33 and welding wire 31 then are located in one of the remaining compartments 82.

The illustrated hose 18 is integrally formed and is most expeditiously formed by extrusion. As noted earlier, the utility of the hose 18 is not limited to fume extracting welding guns, but rather has broad applicability to any situation where it is desired to provide, within a single enclosed elongate structure, the passage of materials out of contact one with another. The passageways 80 and 82 provided in the hose 18 may be used to convey liquids or gases or utilities of various types.

SUMMARY OF DISCLOSURE

In summary of this disclosure, the present invention provides an improved flexible hose having wide utility and particularly useful in connection with fume extracting welding guns. Modifications are possible within the scope of the invention.

What I claim is:

1. In a fume extracting welding gun through which a consumable electrode wire is fed, comprising:

a head portion, a control handle portion, a flexible connector portion, means for removing fumes from the weld site, means for conducting the consumable electrode wire to said head portion, means for conducting shielding gas to said head portion, and means for conducting electricity to the electrode wire at said head portion, the improvement wherein:

said flexible connector portion comprises an integrally-formed flexible hose comprising an outer housing defining a hollow interior and having a smooth outer surface and an inner surface and a plurality of longitudinally-extending baffles located in and coextensive with the hollow interior said baffles being integrally formed with and joined to each other and to the inner surface to define a plurality of separate passageways and extending through said flexible hose for conveying said fumes from said head portion, and additional separate passageways for conducting the consumable electrode wire and the electricity to the head portion and for conducting shielding gas to the head portion.

2. In a fume extracting welding gun through which a consumable electrode wire is fed, comprising:

a head portion, a control handle portion, flexible connector portion, means for removing fumes from the weld site, means for conducting the consumable electrode wire to said head portion, means for conducting shielding gas to said head portion, and means for conducting electricity to the electrode wire at said head portion, the improvement wherein:

said flexible connector portion comprises a flexible hose comprising a cylindrical outer housing defining a hollow interior and a smooth outer surface and an inner cylindrical housing substantially concentrically located with respect to said outer housing and radially extending webs joining said inner cylindrical housing and outer housing to define a plurality of circumferential passageways, said inner cylindrical housing and said radial webs constituting a plurality of longitudinally-extending baffles defining a plurality of separate passageways for conveying said fumes from said head portion, conducting the consumable electrode wire and the electricity to the head portion and for conducting shielding gas to the head portion.

3. The welding gun of claim 2 wherein said means for conducting electricity comprises an annular electrical power cable received in tight-fit relationship with said inner cylindrical housing, and said electrode wire extends substantially concentrically with said power cable in said inner cylindrical housing.

4. The welding gun of claim 3 wherein said means for conducting shielding gas to said head portion comprises flow pipe means extending from a source of shielding gas into gas-tight fit relationship with one end of one of said circumferential passageways to convey shielding gas thereto and second flow pipe means extending from gas-tight fit relationship with the other end of said one circumferential passageway to shielding relationship with said head portion.

5. The welding gun of claim 4 wherein electrical wires extend from a switch mounted to said control handle portion through said one circumferential passageway to a source of services for said gun.

6. The welding gun of claim 5 wherein the remainder of said circumferential passageways communicate at one end with passageways in said head portion and said control handle portion extending from the weld site and at the other end with a source of vacuum thereby to draw fumes from said weld site.

7. The welding gun of claim 2 wherein said hose is formed by extrusion of rubber.

8. The welding gun of claim 6 wherein said one circumferential passageway has a lesser cross sectional dimension than the others of said circumferential passageways.

* * * * *